US006509401B1

(12) United States Patent
Jenewein et al.

(10) Patent No.: US 6,509,401 B1
(45) Date of Patent: *Jan. 21, 2003

(54) SYNERGISTIC FLAME RETARDANT COMBINATION OF SALTS OF 1-HYDROXY-DIHYDROPHOSPHOLE OXIDES AND/OR 1-HYDROXYPHOSPHOLANE OXIDES AND NITROGEN COMPOUNDS FOR USE IN POLYMERS

(75) Inventors: Elke Jenewein, Gersthofen (DE); Bernd Nass, Augsburg (DE); Wolfgang Wanzke, Meitingen (DE)

(73) Assignee: Clariant GmbH, Frankfurt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/141,039

(22) Filed: Aug. 27, 1998

(30) Foreign Application Priority Data

Aug. 29, 1997  (DE) .......................................... 197 37 727

(51) Int. Cl.⁷ ...................... C08K 21/00; C08K 5/3492
(52) U.S. Cl. ...................... 524/116; 252/607; 252/609; 524/100; 524/102; 544/83; 562/19
(58) Field of Search ............................... 252/607, 609; 524/100, 102, 116; 562/19; 544/83

(56) References Cited

U.S. PATENT DOCUMENTS 3,594,347 A    7/1971  Lazarus et al. ............. 524/133

(List continued on next page.)

FOREIGN PATENT DOCUMENTS

BE           700042        * 12/1967

(List continued on next page.)

OTHER PUBLICATIONS

WO 97/39053 published Oct. 1997.*

(List continued on next page.)

*Primary Examiner*—Peter Szekely
(74) *Attorney, Agent, or Firm*—Susan S. Jackson; Scott E. Hanf

(57) ABSTRACT

The present invention relates to a synergistic flame retardant combination for thermoplastic polymers which comprises as component A a salt of 1-hydroxydihydrophosphole oxides of the formula (Ia) or formula (Ib) and/or 1-hydroxyphospholane oxides of the formula (II)

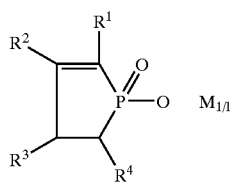

(Ia)

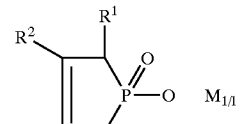

(Ib)

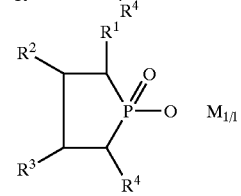

(II)

and as component B a nitrogen compound of the formula (III) to (VIII) or a mixture of the compounds designated by the formulae

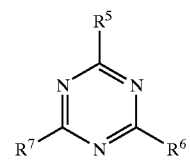
(III)

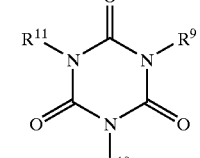

(IV)

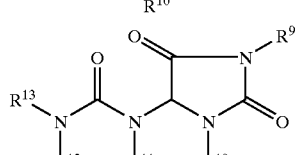

(V)

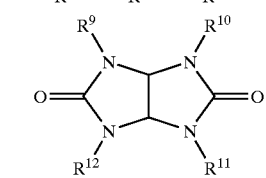

(VI)

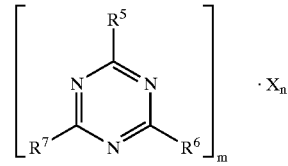

(VII)

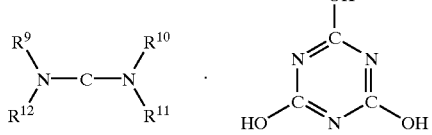

(VIII)

in which the substituents are as defined in the description.

10 Claims, No Drawings

U.S. PATENT DOCUMENTS

| | | | |
|---|---|---|---|
| 3,900,444 A | | 8/1975 | Racky et al. |
| 3,914,193 A | * | 10/1975 | Fessler et al. |
| 4,036,811 A | | 7/1977 | Noetzel et al. |
| 4,180,495 A | | 12/1979 | Sandler ............... 524/133 |
| 4,208,321 A | | 6/1980 | Sandler ............... 524/126 |
| 4,208,322 A | | 6/1980 | Sandler ............... 524/126 |
| 5,326,805 A | | 7/1994 | Sicken et al. |
| 5,430,081 A | * | 7/1995 | Ohmae et al. |
| 5,684,071 A | * | 11/1997 | Mogami et al. ......... 524/100 |
| 5,780,534 A | | 7/1998 | Kleiner et al. |
| 6,087,423 A | | 7/2000 | Kleiner et al. ......... 524/116 |
| 6,252,108 B1 | * | 6/2001 | Seitz ................... 562/19 |
| 6,307,097 B1 | * | 2/2002 | Seitz ................... 562/19 |
| 6,344,158 B1 | * | 2/2002 | Sxhlosser et al. ....... 524/116 |

FOREIGN PATENT DOCUMENTS

| | | |
|---|---|---|
| CA | 2040603 | 10/1991 |
| EP | 0794191 | 9/1997 |
| JP | 5-339417 | 12/1993 |
| WO | WO 97/01664 | 1/1997 |

OTHER PUBLICATIONS

Derwent Abstract.
German Search Report.
Translation for European patent application No. 97102722.02, published under EP 0 794,191.
Abstract for EP 0006568.
Abstract for EP 0584562.
Abstract for EP 0699708.
Abstract for JP 5339417.

* cited by examiner

SYNERGISTIC FLAME RETARDANT COMBINATION OF SALTS OF 1-HYDROXY-DIHYDROPHOSPHOLE OXIDES AND/OR 1-HYDROXYPHOSPHOLANE OXIDES AND NITROGEN COMPOUNDS FOR USE IN POLYMERS

BACKGROUND OF THE INVENTION

1. Field of the Invention

The invention relates to a synergistic flame retardant combination which comprises salts of 1-hydroxydihydrophosphole oxides and/or 1-hydroxyphospholane oxides and certain nitrogen compounds.

2. Description of the Related Art

Polymers are often made flame retardant by adding phosphorus or halogen compounds, or mixtures thereof, to them. Mixtures of phosphorus and nitrogen compounds as well are often used as flame retardants.

Salts of phosphinic acids have proven suitable as effective flame retardant additives for polymers, as have alkali metal salts (DE-A-2 252 258) and salts of other metals (DE-A-2 447 727).

Calcium phosphinates and aluminum phosphinates have been described as particularly effective in polyesters, and impair the mechanical properties of the polymer molding compositions to a lesser extent than do the alkali metal salts (EP-A 699 708).

Synergistic combinations of alkyl and/or aryl phosphinates with certain nitrogen compounds have a more effective action in a whole range of polymers than the phosphinates alone (PCT/EP97/01664).

Alicyclic phosphinates as well, such as the salts of 1-hydroxyphospholane oxides, have recently been described as flame retardants, especially for polyesters and polyamide (European Patent Application No. 97 102 722.2). The flame retardancy, however, especially in the case of thin-walled moldings for the electrical industry, is somewhat poorer than that of comparable alkyl phosphinates. Nevertheless, the alicyclic phosphinates are less soluble in water than the alkyl phosphinates and are therefore more suited for use in polymeric molding compositions for the electrical industry.

BRIEF SUMMARY OF THE INVENTION

It has now surprisingly been found that by adding nitrogen-containing synergists it is possible very considerably to increase the effectiveness of alicyclic phosphinates, especially in thin-walled moldings, thereby achieving a level of flame retardancy which matches that of the synergistic mixtures with alkyl phosphinates.

DETAILED DESCRIPTION OF THE INVENTION

The invention thus relates to a synergistic flame retardant combination for thermoplastic polymers which comprises as component A a salt of 1-hydroxydihydrophosphole oxides of the formula (Ia) or formula (Ib) and/or 1-hydroxyphospholane oxides of the formula (II)

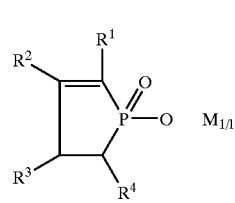

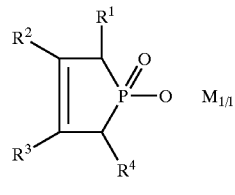

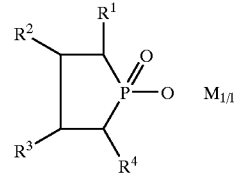

in which $R^1$ to $R^4$ are hydrogen or $C_1$–$C_{12}$-alkyl, preferably $C_1$–$C_4$-alkyl, especially methyl or ethyl;

M is a metal from the second or third main group or subgroup of the Periodic Table, such as magnesium, calcium, zinc or aluminum, preferably aluminum, and l is 1, 2 or 3 and as component B a nitrogen compound of the formula (III) to (VIII) or a mixture of the compounds designated by the formulae

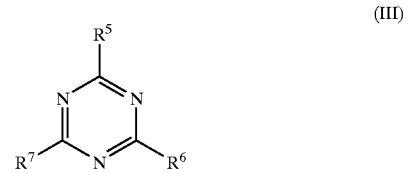

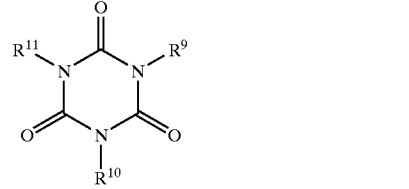

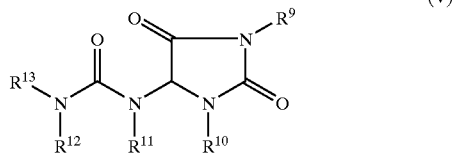

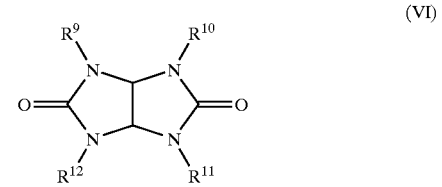

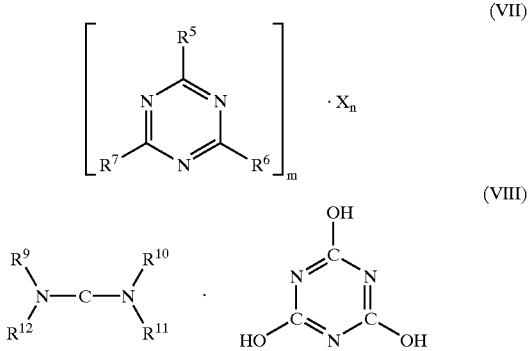

in which $R^5$, $R^6$ and $R^7$ can be defined as follows: hydrogen, $C_1$–$C_8$-, preferably $C_1$–$C_4$-alkyl, $C_5$–$C_{16}$-, preferably $C_5$–$C_8$-cycloalkyl or -alkylcycloalkyl possibly substituted by a hydroxyl or a $C_1$–$C_4$-hydroxyalkyl function, $C_2$–$C_8$-, preferably $C_2$–$C_4$-alkenyl, $C_1$–$C_8$-, preferably $C_1$–$C_4$-alkoxy, -acyl, -acyloxy, $C_6$–$C_{12}$-aryl or -arylalkyl, preferably $C_6$–$C_{10}$-aryl or -arylalkyl and also —$OR^8$ and —$N(R^8)R^9$ (excluding melamine, $R^8$=$R^9$=H) and also N-alicyclic or N-aromatic. N-alicyclic in this case denotes cyclic heteroalkanes or heteroalkenes having 1 to 2 nitrogen atoms and a ring size of from 5 to 8, preferably from 5 to 6. Examples thereof are pyrrolidine, piperidine, imidazolidine, piperazine or 2,5-dihydropyrrole. N-aromatic denotes heteroaromatic 5- or 6-membered ring compounds which include 1 to 2 nitrogen atoms in the ring, such as pyrrole, pyridine, imidazole, pyrazine, and also condensed aromatic compounds having 9 to 14, preferably 9 to 10 carbon atoms, of which from 1 to 3, preferably from 1 to 2 CH groups can be replaced by a nitrogen atom, such as quinoline, phenanthroline, phenazine.

$R^8$ denotes the following groups: hydrogen, $C_1$–$C_8$-, preferably $C_1$–$C_4$-alkyl, $C_5$–$C_{16}$-, preferably $C_5$–$C_8$-cycloalkyl or -alkylcycloalkyl possibly substituted by a hydroxyl or a $C_1$–$C_4$-hydroxyalkyl function, $C_2$–$C_8$-, preferably $C_2$–$C_4$-alkenyl, $C_1$–$C_8$-, preferably $C_1$–$C_4$-alkoxy, -acyl, -acyloxy or $C_6$–$C_{12}$-, preferably $C_6$–$C_{10}$-aryl or -arylalkyl.

$R^9$, $R^{10}$, $R^{11}$, $R^{12}$ and $R^{13}$ denote the same groups as $R^8$ and also —O—$R^8$.

m and n are 1, 2, 3 or 4.

X denotes acids which are able to form adducts with triazine compounds (III) (including melamine), examples being cyanuric acid, phosphoric acid, orthoboric acid, metaboric acid.

In the text below the term "salt" denotes salts of 1-hydroxydihydrophosphole oxides and of 1-hydroxyphospholane oxides.

Examples of suitable salts are the alkaline earth metal, magnesium, zinc and aluminum salts of 1-hydroxy-3-alkyl-2,3-dihydro-1H-phosphole 1-oxide, 1-hydroxy-3-methyl-2,5-dihydro-1H-phosphole 1-oxide, 1-hydroxy-2,3-dihydro-1H-phosphole 1-oxide, 1-hydroxy-2,5-dihydro-1H-phosphole 1-oxide, 1-hydroxy-1H-phospholane 1-oxide and 1-hydroxy-3-methyl-1H-phospholane 1-oxide, and mixtures of these salts. The aluminum salts are preferred.

The salts can be prepared from the 1-hydroxydihydrophosphole oxides and 1-hydroxyphospholane oxides by known methods in which it is possible to employ, in aqueous solution, the metal carbonates, metal hydroxides or metal oxides. The 1-hydroxydihydrophosphole oxides are obtainable by known methods from the 1-chlorodihydrophosphole oxides, which can be prepared, for example, in accordance with EP-A-0 452 755. The 1-hydroxyphospholane oxides can be prepared from these by hydrogenation.

Polymers for the purposes of the invention are also described in the application PCT/EP97/01664 on pages 6 and 9, the content of which is expressly incorporated herein by reference.

The amount of the salts to be added to the polymers can vary within wide limits. In general use is made of from 1 to 30% by weight, based on the finished polymer compound. The optimum amount depends on the nature of the polymer, on the nature of component B and on the type of salt employed itself, and can easily be determined by experimentation. Preference is given to from 3 to 20, in particular from 5 to 15% by weight.

The salts of the invention can be used in different physical forms depending on the nature of the polymer used and on the desired properties. Thus in order to obtain a better dispersion in the polymer, for example, the salts can be ground into a finely divided form. If desired, it is also possible to employ mixtures of different salts.

The salts of the invention are thermally stable, and neither decompose the polymers in the course of processing nor influence the process of producing the plastics molding composition. The salts are nonvolatile under preparation and processing conditions for polymers.

As component B the synergistic flame retardant combination comprises a nitrogen compound of the formula (III) to (VIII) or a mixture of the compounds designated by the formulae.

Formula (VII) denotes adducts of the triazine compounds (III) (including melamine) with appropriate acids, where m and n can each be 1, 2, 3 or 4. Examples of such compounds are melamine cyanurate, melamine phosphate, dimelamine phosphate, melamine pyrophosphate and melamine diborate.

As component B it is likewise possible to employ oligomeric esters of tris(hydroxyethyl) isocyanurate with aromatic polycarboxylic acids, as are described in EP-A 584 567.

It is likewise possible as component B to employ nitrogen-containing phosphates of the formulae $(NH_4)_yH_{3-y}PO_4$ and $(NH_4PO_3)_z$, where y can adopt numerical values from 1 to 3 and z is an arbitrary number which, in addition, is typically the average value of a chain-length distribution.

Preferred nitrogen compounds in the context of the invention are benzoguanamine (formula III, $R^5$=phenyl, $R^6$=$R^7$=$NH_2$), tris(hydroxyethyl) isocyanurate (formula IV, $R^9$=$R^{10}$=$R^{11}$=—$CH_2$—$CH_2$—OH), allantoin (formula V, $R^9$=$R^{10}$=$R^{11}$=$R^{12}$=$R^{13}$=H), glycoluril (formula VI, $R^9$=$R^{10}$=$R^{11}$=$R^{12}$=H) and also melamine cyanurate, melamine phosphate, dimelamine phosphate and melamine pyrophosphate (all of the type of formula VII), urea cyanurate ($R^9$ to $R^{12}$=H; of the type of formula VIII) and ammonium polyphosphate $(NH_4PO_3)_2$.

The nitrogen compounds employed as component B are prepared, in some cases industrially, by known processes.

The amount of nitrogen compound (component B) to be added to the polymers can be varied within wide limits. In general use is made of from 1 to 30% by weight, based on the finished polymer compound. The optimum amount depends on the nature of the polymer, on the nature of the salt employed (component A) and on the type of nitrogen compound itself, and can easily be determined by experimentation. Preference is given to from 3 to 20, in particular from 5 to 15% by weight.

Preferred thermoplastic polymers are engineering plastics, such as polystyrene-HI (with increased impact strength), polyphenylene ethers, polyamides, polyesters, polycarbonates and blends or polyblends such as ABS or PC/ABS.

Particular preference is given to polyesters, polyamides and ABS polymers.

The flame retardant components A and B can be incorporated into plastics molding compositions by, for example, premixing all of the constituents, as powders and/or granules, in a mixer and then homogenizing the mixture in the polymer melt in a compounder (for example, a twin-screw extruder). The melt is commonly drawn off as a strand, cooled and granulated. Components A and B can also be introduced separately by way of a metering system directly into the compounder.

It is likewise possible to admix the flame retardant additives A and B to finished polymer granules and to process the mixture directly into moldings on an injection molding machine.

In the case of polyesters, for example, the flame retardant additives A and B can also be added to the polyester mass in the course of polycondensation.

In addition to the flame retardant components A and B the molding compounds may also have added to them fillers and reinforcing agents such as glass fibers, glass beads or minerals such as chalk. In addition, the molding compounds may include other additives, such as antioxidants, light stabilizers, lubricants, colorants, nucleating agents or antistats. Examples of the additives that can be used are given in EP-A-584 567.

The flame retardant plastics compositions are suitable for producing moldings, films, filaments and fibers by means, for example, of injection molding, extrusion or compression.

EXAMPLES

Components Employed

Commercial Polymers (Granules):
  Polybutylene Terephthalate
    (PBT-GV): ®Celanex 2300 GV1/30 (from Hoechst ®Celanese, USA), contains 30% glass fibers.
    (PBT): ®Celanex 2500 (from Hoechst Celanese, USA) contains no fillers or reinforcing agents.
  Polyamide 6 (PA 6): ®Durethan B29 (from Bayer AG, D), contains no fillers or reinforcing agents.
  ABS polymer: ®Novodur P2X (from Bayer AG, D), contains no fillers or reinforcing agents.
Flame Retardant Components (Powders):
  Aluminum salt of 1-hydroxy-1H-phospholane 1-oxide, referred to below as PHOLAL.
  Aluminum salt of 1-hydroxy-3-methyl-1H-phospholane 1-oxide, referred to below as methyl-PHOLAL.
  Aluminum salt of methylethylphosphinic acid, referred to below as MEPAL (acyclic phosphinate, for comparison)
Nitrogen-containing synergists (powders):
  Dimelamine phosphate (from DSM Chemicals & Fertilizers, NL)
  Glycoluril (Soc. Francaise Hoechst, F)
  ®Hostaflam AP 422 (from Clariant GmbH, D)
  Melamine cyanurate (from DSM, NL)
  Melamine phosphate (from DSM, NL)
  TPA-THEIC=oligomeric terephthalic ester of tris (hydroxyethyl) isocyanurate (in accordance with EP-A-584 562)

Comparison of Water Solubilities at 20° C.

Comparative example:
  MEPAL 6.3 g/l
  PHOLAL 4.3 g/l

Preparation, Processing and Testing of Flame Retardant Polymer Molding Compositions The flame retardant components were mixed in the proportion stated in the tables with the polymer granules and, where used, additives and were incorporated on a twin-screw extruder (model Leistritz LSM 30/34) at temperatures from 230 to 260° C. The homogenized polymer extrudate was drawn off, cooled in a water bath and then granulated.

After sufficient drying, the molding compounds were processed into test specimens on an injection molding machine (model Toshiba IS 100 EN) at melt temperatures from 240 to 270° C. and were tested for flame retardancy, and classified, on the basis of the UL 94 test (Underwriter Laboratories). The flammability of the test specimens was assessed by determining the oxygen index (LOI in accordance with ASTM D 2863-77).

Tables 1 and 2 show comparative examples in which aluminum salts of 1-hydroxydihydrophosphole oxides or 1-hydroxyphospholane oxides, respectively, were tested as sole flame retardant components in PBT, PA 6 and ABS. Table 3 shows the comparative examples in which nitrogen compounds were tested as sole components.

The results of the examples in which salts in accordance with the invention were employed in combination with nitrogen compounds are listed in Table 4. All amounts are in % by weight and relate to the finished polymer compound including flame retardant.

From the examples it is evident that nitrogen compounds in the novel combination with metal salts of 1-hydroxy-dihydrophosphole oxides and of 1-hydroxyphospholane oxides show very good flame retardancy. The amount of the salts, based on the finished polymer compound, required to achieve a V-0 or V-1 or V-2 classification can be reduced considerably in the synergistic combination. Through the use of the synergistic combinations of the invention it is also possible to produce thin-walled moldings which meet the requirements of fire class V-0 or V-1 or V-2.

TABLE 1

Results from EP 97 102 722.2: aluminum salt of 1-hydroxy-2,5-dihydro-1H-phosphole 1-oxide (formula Ib, $R^1$ to $R^4$ = H) in 30% glass fiber-reinforced polybutylene terephthalate.

| Al salt [%] | UL 94 classification (1.2 mm) |
|---|---|
| 20 | V-0 |
| 17.5 | V-1 |
| 15 | V-2 |
| 12.5 | V-2 |

TABLE 2

Comparative examples. Aluminum salts of 1-hydroxyphospholane oxide (formula II) as sole flame retardant component in PBT, PA 6 and ABS.

| Polymer | PHOLAL [%] | Methyl-PHOLAL [%] | UL 94 classification (1.6 mm) | UL 94 classification (0.8 mm) | LOI [%] |
|---|---|---|---|---|---|
| PBT-GV | 20 | | V-1 | V-1 | 37.0 |
| PBT-GV | 25 | | V-1 | V-1 | 41.0 |
| PBT-GV | | 20 | n. c.*) | | |
| PBT-GV | | 25 | n. c.*) | | |
| PBT | 10 | | V-2 | | 33.0 |
| PBT | 15 | | V-0 | V-0 | 34.0 |
| PBT | 20 | | V-0 | V-0 | 37.0 |
| PA 6 | 15 | | V-2 | V-2 | 28.5 |
| PA 6 | 20 | | V-2 | V-2 | 28.0 |
| ABS | 30 | | n. c.*) | | 22.5 |

*)n. c. = not classifiable

TABLE 3

Comparative examples. Nitrogen compounds as sole flame retardant components in PBT, PA 6 and ABS.

| Polymer | Melamine cyanurate [%] | Melamine phosphate [%] | TPA-THEIC [%] | Hostaflam AP 422 [%] | UL 94 classification (1.6 mm) |
|---|---|---|---|---|---|
| PBT-GV | 10 | | | | n. c.*) |
| PBT-GV | 20 | | | | n. c.*) |
| PBT-GV | 25 | | | | n. c.*) |
| PBT-GV | | 10 | | | n. c.*) |
| PBT-GV | | 20 | | | n. c.*) |
| PBT-GV | | | 10 | | n. c.*) |
| PBT-GV | | | 25 | | n. c.*) |
| PBT | 30 | | | | V-2 |
| PA 6 | | 20 | | | V-2 |
| ABS | | | | 15 | n. c.*) |
| ABS | | | | 30 | V-2 |

*)n. c. = not classifiable

TABLE 4

Examples. Aluminum salts of 1-hydroxyphospholane oxides (formula II) in combination with nitrogen-containing synergists.

| Polymer | PHOLAL [%] | Methyl-PHOLAL [%] | Synergist | Amount of synergist [%] | UL 94 classification (1.6 mm) | UL 94 classification (0.8 mm) | LOI [%] |
|---|---|---|---|---|---|---|---|
| PBT-GV | 8 | | Dimelamine phosphate | 8 | V-1 | | 29.5 |
| PBT-GV | 10 | | Dimelamine phosphate | 5 | V-1 | | 37.5 |
| PBT-GV | 10 | | Glycoluril | 10 | V-0 | V-2 | 34.5 |
| PBT-GV | 10 | | Glycoluril | 5 | V-1 | | 32.0 |
| PBT-GV | 10 | | Melamine cyanurate | 10 | V-1 | V-1 | 42.0 |
| PBT-GV | 12 | | Melamine cyanurate | 12 | V-0 | V-0 | 42.0 |
| PBT-GV | | 10 | Melamine cyanurate | 10 | V-1 | | |
| PBT-GV | 10 | | Melamine phosphate | 10 | V-0 | V-0 | 29.5 |
| PBT-GV | | 10 | Melamine phosphate | 10 | V-0 | | |
| PBT-GV | 10 | | TPA-THEIC | 10 | V-1 | V-1 | 34.0 |
| PBT-GV | 12 | | TPA-THEIC | 12 | V-0 | V-0 | 42.0 |
| PBT-GV | | 10 | TPA-THEIC | 10 | V-1 | | |
| PBT | 10 | | Melamine cyanurate | 5 | V-0 | V-0 | 33.0 |
| PBT | | 1a | Melamine cyanurate | 5 | V-0 | | |
| PA 6 | 10 | | Melamine phosphate | 10 | V-0 | V-0 | 24.5 |
| ABS | 15 | | Hostaflam AP 422 | 15 | V-0 | | 26.0 |

What is claimed is:

1. A synergistic flame retardant combination for thermoplastic polymers which comprises as component A a salt of 1-hydroxydihydrophosphole oxides of the formula (Ia) or formula (Ib) and/or 1-hydroxyphospholane oxides of the formula (II)

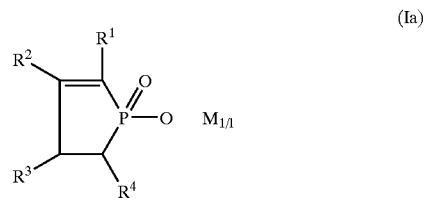

(Ia)

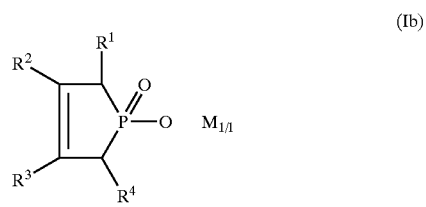

(Ib)

-continued

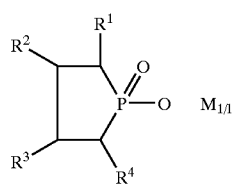
(II)

in which

R¹, R², R³, R⁴ are hydrogen or $C_1$–$C_{12}$-alkyl,

M is a metal from the second or third main group or subgroup of the Periodic Table, and l is 1, 2 or 3 and as component B a nitrogen compound of the formula (III) to (VIII) or a mixture of the compounds designated by the formulae

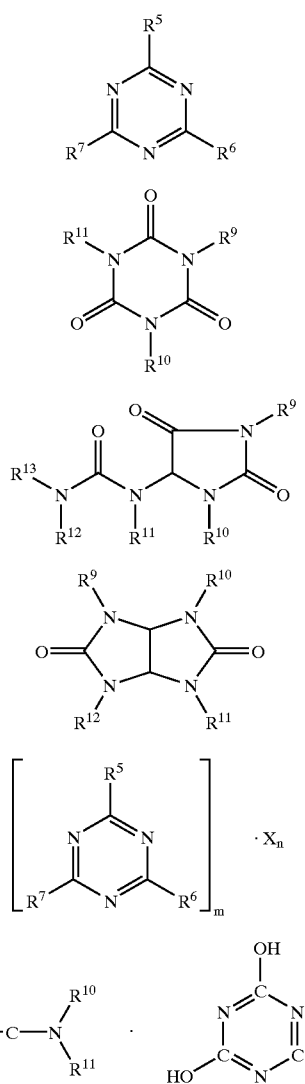

in which

R⁵ to R⁷ are hydrogen, $C_1$–$C_8$-alkyl, $C_5$–$C_{16}$-cycloalkyl or -alkylcycloalkyl, possibly substituted by a hydroxyl or a $C_1$–$C_4$-hydroxyalkyl function, $C_2$–$C_8$-alkenyl, $C_1$–$C_8$-alkoxy, -acyl, -acyloxy, $C_6$–$C_{12}$-aryl or -arylalkyl, —OR⁸ and —N(R⁸)R⁹, where R⁸ and R⁹ are not both hydrogen, and also N-alicyclic or N-aromatic, R⁸ is hydrogen, $C_1$–$C_8$-alkyl, $C_5$–$C_{16}$-cycloalkyl or -alkylcycloalkyl, possibly substituted by a hydroxyl or a $C_1$–$C_4$-hydroxyalkyl function, $C_2$–$C_8$-alkenyl, $C_1$–$C_8$-alkoxy, -acyl, -acyloxy or $C_6$–$C_{12}$-aryl or -arylalkyl, R⁹ to R¹³ are the same groups as R⁸ and also —O—R⁸, m and n independently of one another are 1, 2, 3 or 4, and X denotes acids which are able to form adducts with triazine compounds (III).

2. The flame retardant combination as claimed in claim 1, wherein

R¹ to R⁴ are hydrogen or $C_1$–$C_4$-alkyl,

M is aluminum, magnesium, calcium or zinc, l is 1, 2 or 3

R⁵ to R⁷ are hydrogen, $C_1$–$C_4$-alkyl, $C_5$–$C_8$-cycloalkyl or alkylcycloalkyl possibly substituted by a hydroxyl or a $C_1$–$C_4$-hydroxyalkyl function, $C_2$–$C_4$-alkenyl, $C_1$–$C_4$-alkoxy, -acyl, -acyloxy, $C_6$–$C_{10}$-aryl or arylalkyl, —OR⁸ and N(R⁸)R⁹, where R⁸ and R⁹ are not both hydrogen, and also N-alicyclic or N-aromatic, R⁸ is hydrogen, $C_1$–$C_4$-alkyl, $C_5$–$C_8$-cycloalkyl or alkylcycloalkyl possibly substituted by a hydroxyl or a $C_1$–$C_4$-hydroxyalkyl function, $C_2$–$C_4$-alkenyl, $C_1$–$C_4$-alkoxy, -acyl, -acyloxy, $C_6$–$C_{10}$-aryl or arylalkyl, and X is cyanuric acid, phosphoric acid, orthoboric acid or metaboric acid.

3. The flame retardant combination as claimed in claim 1, wherein

R¹ to R⁴ are hydrogen, methyl or ethyl,

M is aluminum,

R⁵ to R⁷ are hydrogen or phenyl,

R⁸ is hydrogen or $C_1$–$C_4$-alkyl,

R⁹ to R¹⁹ are hydrogen or $C_1$–$C_4$-hydroxyalkyl, and

X is phosphoric acid or cyanuric acid.

4. The flame retardant combination as claimed in claim 1, wherein component B is benzoguanamine, tris (hydroxyethyl) isocyanurate, allantoin, glycoluril, melamine cyanurate, melamine phosphate, dimelamine phosphate, melamine pyrophosphate, melamine diborate or ammonium polyphosphate.

5. A method of conferring flame retardancy on thermoplastic polymers using a flame retardant combination as claimed in claim 1.

6. The method as claimed in claim 5, wherein the polymers are polyesters, polyamides or ABS polymers.

7. The method as claimed in claim 5, wherein component A and B are employed independently of one another each in a concentration of from 1 to 30% by weight, based on the finished polymer compound.

8. The method as claimed in claim 5, wherein component A and B are employed independently of one another each in a concentration of from 3 to 20% by weight, based on the finished polymer compound.

9. The method as claimed in claim 5, wherein component A and B are employed independently of one another each in a concentration of from 5 to 15% by weight, based on the finished polymer compound.

10. A flame retardant plastics molding composition comprising a flame retardant combination as claimed in claim 1.

* * * * *